United States Patent
Yeom et al.

(10) Patent No.: US 10,367,370 B2
(45) Date of Patent: *Jul. 30, 2019

(54) WIRELESS CHARGING AND COMMUNICATION BOARD AND WIRELESS CHARGING AND COMMUNICATION DEVICE

(71) Applicant: LG INNOTEK CO., LTD., Seoul (KR)

(72) Inventors: Jai Hoon Yeom, Seoul (KR); Sang Won Lee, Seoul (KR); Seok Bae, Seoul (KR); So Yeon Kim, Seoul (KR); Jin Mi Noh, Seoul (KR); Ji Yeon Song, Seoul (KR); Hee Jung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,895

(22) Filed: Aug. 24, 2018

(65) Prior Publication Data

US 2018/0366972 A1 Dec. 20, 2018

Related U.S. Application Data

(63) Continuation of application No. 15/651,902, filed on Jul. 17, 2017, now Pat. No. 10,110,052, which is a continuation of application No. 14/636,347, filed on Mar. 3, 2015, now Pat. No. 9,843,215.

(30) Foreign Application Priority Data

Mar. 4, 2014 (KR) ........................ 10-2014-0025290

(51) Int. Cl.
*H02J 7/00* (2006.01)
*H02J 7/02* (2016.01)
(Continued)

(52) U.S. Cl.
CPC .............. *H02J 7/025* (2013.01); *H02J 5/005* (2013.01); *H02J 7/0042* (2013.01); *H02J 50/10* (2016.02)

(58) Field of Classification Search
CPC ...................................................... H02J 7/0025
(Continued)

(56) References Cited

U.S. PATENT DOCUMENTS 6,331,763 B1 * 12/2001 Thomas ................. H02H 9/042
320/136
9,843,215 B2 12/2017 Yeom et al.
(Continued)

FOREIGN PATENT DOCUMENTS

CN 102064541 5/2011
KR 10-2013-0072181 7/2013
(Continued)

OTHER PUBLICATIONS

Extended European Search Report dated Jul. 30, 2015 issued in Application No. 15157518.0.
(Continued)

*Primary Examiner* — Samuel Berhanu
(74) *Attorney, Agent, or Firm* — Ked & Associates, LLP

(57) ABSTRACT

Provided are a wireless charging and communication board, and a wireless charging and communication device, the wireless charging and communication board including: a soft magnetic layer; a polymeric material layer arranged on one surface and the other surface of the soft magnetic layer and extending longer than an exposed portion of the soft magnetic layer; and a coil pattern arranged on the polymeric material layer.

20 Claims, 6 Drawing Sheets

(51) Int. Cl.
*H02J 5/00* (2016.01)
*H02J 50/10* (2016.01)

(58) Field of Classification Search
USPC .......................................................... 320/108
See application file for complete search history.

(56) References Cited

U.S. PATENT DOCUMENTS

| | | | |
|---|---|---|---|
| 2006/0266435 A1* | 11/2006 | Yang ................ | G06K 19/07771 148/105 |
| 2009/0021212 A1 | 1/2009 | Hasegawa et al. | |
| 2011/0210696 A1 | 9/2011 | Inoue | |
| 2014/0168019 A1 | 6/2014 | Hirobe et al. | |
| 2015/0077296 A1* | 3/2015 | An .......................... | H01Q 1/22 343/720 |
| 2015/0123604 A1 | 5/2015 | Lee et al. | |
| 2015/0256023 A1* | 9/2015 | Yeom ..................... | H02J 5/005 320/108 |

FOREIGN PATENT DOCUMENTS

| | | |
|---|---|---|
| TW | 201347349 | 11/2013 |
| WO | WO 2011/031473 | 3/2011 |
| WO | WO 2013/065245 | 5/2013 |
| WO | WO 2013/095036 | 6/2013 |
| WO | WO 2013/141658 | 9/2013 |

OTHER PUBLICATIONS

U.S. Non-Final Office Action dated Aug. 25, 2016 issued in co-pending U.S. Appl. No. 14/636,347.
U.S. Notice of Allowance dated Mar. 28, 2017 issued in co-pending U.S. Appl. No. 14/636,347.
European Search Report dated Dec. 14, 2017 issued in Application No. 17184968.0.
Taiwanese Office Action (with English translation) dated Oct. 11, 2018 issued in TW Application No. 104106624.
U.S. Appl. No. 14/636,347, filed Mar. 3, 2015.
U.S. Appl. No. 15/651,902, filed Jul. 17, 2017

* cited by examiner

| BEFORE TEST FOR RELIABILITY | | AFTER TEST FOR RELIABILITY | |
|---|---|---|---|
| TRANSMISSION EFFICIENCY(%) | RECOGNITION DISTANCE(mm) | TRANSMISSION EFFICIENCY(%) | RECOGNITION DISTANCE(mm) |
| 69.42 | 35 | 69.38 | 35 |

WIRELESS CHARGING AND COMMUNICATION BOARD AND WIRELESS CHARGING AND COMMUNICATION DEVICE

CROSS-REFERENCE TO RELATED APPLICATION

This application is a Continuation Application of prior U.S. patent application Ser. No. 15/651,902 filed Jul. 17, 2017, which is a Continuation Application of prior U.S. patent application Ser. No. 14/636,347 filed Mar. 3, 2015, now U.S. Pat. No. 9,843,215, which claims priority under 35 U.S.C. § 119 to Korean Application No. 10-2014-0025290, filed on Mar. 4, 2014, in the Korean Intellectual Property Office, whose entire disclosures are hereby incorporated by reference.

BACKGROUND OF THE INVENTION

1. Field

Embodiments of the present application relate to a wireless charging and communication board and a wireless charging and communication device.

2. Background

As one of radio frequency tag identification (RFID) technologies, near field communication (NFC) is a smart card type contactless communication technology using a frequency band of 13.56 MHz. As a wireless charging technology, wireless power conversion (WPC) is a contactless charging technology for charging a battery using magnetic coupling at a short range without electrical contact.

NFC is a next-generation near field communication technology which receives attention because NFC enables wireless communication between electrical devices at a short range with low power and has relatively excellent security due to the short communication range and a low price. Furthermore, it is advantageous in that NFC has a bidirectional property and a large storage memory space compared to a smart card, and the range of applicable services is wide. Also, it is advantageous in that WPC can be applied to various fields regarding battery charging because WPC enables battery charging via magnetic coupling without electrical contact.

An antenna used in the NFC or WPC system includes a coil having a fixed area and receives necessary energy for the operation of a microchip from a reader. A magnetic field is formed by alternating current power energy generated from a primary coil so that electrical currents passing through the coil of the antenna can be abandoned, and a voltage is generated by an inductance of the antenna. The voltage is used as power for data transmission or is used in charging a battery.

As a smart terminal has widely come into wide use, the need of a device capable of providing both the NFC and WPC has been increased. Thus, the development of a device having high charging efficiency and a sufficient long recognition distance upon data communication has been required.

BRIEF DESCRIPTION OF THE DRAWINGS

The embodiments will be described in detail with reference to the following drawings in which like reference numerals refer to like elements wherein.

DETAILED DESCRIPTION

Figure 1:
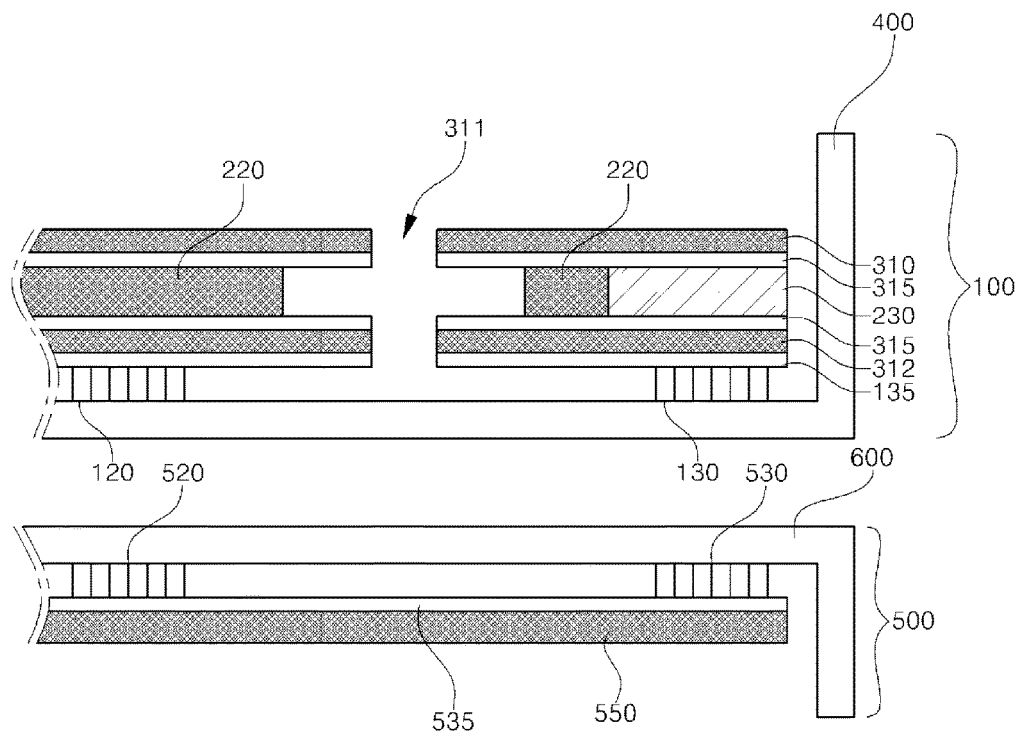
FIG. 1 is a cross-sectional view of a wireless charging and communication device according to one embodiment of the present application.

Hereinafter, the embodiments of the present application that an ordinary person skilled in the art can implement will be described with reference to the accompanying drawings. The embodiments in the specification and the constructions shown in the drawings are provided as a preferred embodiment of the present application, and it should be understood that there may be various equivalents and modifications which could substitute at the time of filing. In addition, when it comes to the operation principle of the preferred embodiments of the present application, when the known functions or functions are seemed to make unclear the subject matters of the present application, they will be omitted from the descriptions of the invention. The terms below are defined in consideration of the functions of the present application, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

FIG. 1 is a cross-sectional view of a wireless charging and communication device according to one embodiment of the present application.

A wireless charging and communication device according to one embodiment of the present application will be hereinafter described with reference to FIG. 1.

The wireless charging and communication device according to the present embodiment of the invention may be included for wireless power conversion (WPC) and near field communication (NFC).

As illustrated in FIG. 1, the wireless charging and communication device according to the present embodiment of the invention may include a receiver 100 and a transmitter 500.

The receiver 100 and the transmitter 500 may enable wireless power conversion (WPC) and near field communication (NFC).

The receiver 100 may include a reception coil pattern 120, 130, wherein the first reception coil pattern 120 is a coil pattern for wireless power conversion (WPC), and the second reception coil pattern 130 is a coil pattern for near field communication (NFC).

Also, the transmitter 500 may include a transmission coil pattern 520, 530, wherein the first transmission coil pattern 520 is a coil pattern for wireless power conversion (WPC), and the second transmission coil pattern 530 is a coil pattern for near field communication (NFC).

The first transmission coil pattern 520 is connected to a power source (not drawn), and the first reception coil patterns 120 is connected to a circuit part (not drawn).

The power source may be an alternating current power source providing an alternating current having a predetermined frequency. An alternating current flows through the first transmission coil patterns 520 by power supplied from the power source (not drawn).

When the alternating current flows through the first transmission coil pattern 520, the alternating current is also induced to the first reception coil pattern 120 spaced apart from the first transmission coil pattern 520 by electromagnetic induction.

The current induced to the reception coil pattern 120 is transmitted to the separate circuit part (not drawn) and is then rectified.

Meanwhile, the transmitter 500 according to the present embodiment of the invention may be composed of a transmission pad, and the receiver 100 may be constituted as an element for a portable terminal, a home/personnel electronic product, a transportation means and the like to which wireless power conversion is applied. The portable terminal, the home/personnel electronic product, the transportation means and the like to which wireless power conversion is applied may include only a wireless power receiver or may include both a wireless power transmitter and a wireless power receiver.

That is, the transmitter 500 may serve as a reader, and the receiver 100 may serve as a tag.

The receiver 100 may include a wireless charging and communication board and a housing 400 in which the wireless charging and communication board is received. The housing 400 may radiate heat generated from the coil pattern 120, 130 to the outside.

Meanwhile, the wireless charging and communication board may include: a soft magnetic layer 220, 230; a polymeric material layer 310, 312 disposed on one surface and the other surface of the soft magnetic layer 220, 230 and extending longer than an exposed portion of the soft magnetic layer 220, 230; the coil pattern 120, 130; and a processing hole 311 passing through the wireless charging and communication board and used in performing aligning.

Also, the polymeric material layer 310, 312 may include a first polymeric material layer 310 arranged on one surface of the soft magnetic layer 220, 230, and a second polymeric material layer 321 arranged on the other surface of the soft magnetic layer 220, 230.

At this time, the polymeric material layer 310, 312 may be made with a black film. The polymeric material layer 310, 312 may be adhered to the soft magnetic layer 220, 230 via an adhesive layer 315. The polymeric material layer 310, 312 may contain any one material of polyethylene, polyacrylic, polyimide, polyamide, and polyurethane.

Meanwhile, the soft magnetic layer 220, 230 may be configured such that, on the same plane on which the first soft magnetic layer 220 and the second soft magnetic layer 230 are arranged, the second soft magnetic layer 230 is arranged around the first soft magnetic layer 220, more specifically, the second soft magnetic layer 230 is disposed to surround the first soft magnetic layer 220.

Also, the coil pattern 120, 130 may include the first coil pattern 120 arranged in a region on the second polymeric material layer 312 corresponding to the first soft magnetic layer 220, and second coil pattern 130 arranged in a region on the second polymeric material layer 312 corresponding to the second soft magnetic layer 230.

The transmitter 500 may include: a soft magnetic layer 550; a transmission coil pattern 520, 530 attached to the soft magnetic layer 550 via an adhesive layer 535; and a housing 600.

Accordingly, according to the present embodiment of the invention, both the constitution including the first soft magnetic layer 220 and the first coil pattern (120) and capable of enabling wireless power conversion (WPC) and the constitution including the second soft magnetic layer 230 and the second coil pattern 130 and capable of enabling near field communication (NFC) may be included, and both the WPC and NFC may be provided.

Meanwhile, in another embodiment, the first transmission coil pattern 520 may be composed of a coil pattern for near field communication (NFC), and the second transmission coil pattern 530 may be composed of a coil pattern for wireless power conversion (WPC).

Figure 2:
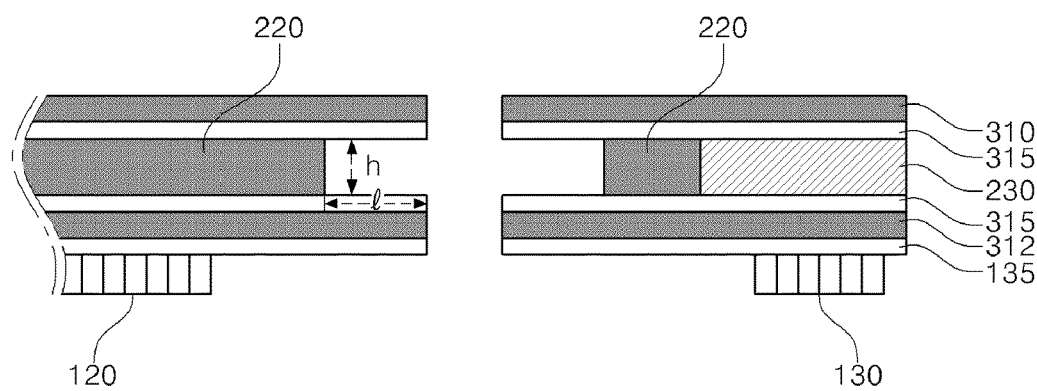
FIG. 2 is a cross-sectional view of a wireless charging and communication board according to one embodiment of the present application.

FIG. 2 is a cross-sectional view of a wireless charging and communication board according to one embodiment of the present application.

As illustrated in FIG. 2, a wireless charging and communication board according to one embodiment of the present application may include: a soft magnetic layer 220, 230; a polymeric material layer 310 312 arranged on one surface and the other surface of the soft magnetic layer 220, 230 and extending longer than an exposed portion of the soft magnetic layer 220, 230; and a coil pattern 120, 130 arranged on the polymeric material layer 310, 312.

Also, the polymeric material layer 310, 312 may include a first polymeric material layer 310 and a second polymeric material layer 312; the soft magnetic layer 220, 230 may include a first soft magnetic layer 220 and a second magnetic layer 230; and the coil pattern 120, 130 may include a first coil pattern 120 and a second coil pattern 130.

Also, an extending portion length l of a first polymeric material layer 310 or a second polymeric material layer 312 and a thickness h of the magnetic soft material layer 220, 230 may be formed to have a relation of the following Equation 1.

$$l = A \times h \qquad \text{[Equation 1]}$$

At this time, l represents an extending portion length of the first polymeric material layer 310 or the second polymeric material layer 312, h represents a thickness of the soft magnetic layer 220, 230, and A represents a constant of 0.6 to 10. When the value of A is less than 0.6, the polymeric material layer 310, 312 may not sufficiently surround the soft magnetic layer 220, 230, so that moisture can penetrate. When the value of A is more than 10, the polymeric material layer 310, 312 may excessively extend so that the polymeric material layer can be easily bent and damaged by an external impact, or a thickness can be increased because a separate receiving part should be added.

Also, the first soft magnetic layer 220 and the second soft magnetic layer 230 may be made of different materials. For example, the first soft magnetic layer 220 may be made with an amorphous ribbon, and the second soft magnetic layer 230 may be made of any one material of a composite, a ferrite, a Ni—Zn material, and a Mn—Zn material.

When the first soft magnetic layer 220 is made with an amorphous ribbon, high permeability can be implemented in an operating frequency of 100 to 200 kHZ. When the second soft magnetic layer 230 is made of any one material of a composite, a ferrite, a Ni—Zn material, and a Mn—Zn material, data loss generated during communication can be reduced.

When the soft magnetic layer 120 is made of a ferrite material, the soft magnetic layer may be implemented in various forms such as a pellet form, a plate form, a ribbon form, a foil form, a film form and the like. Also, the soft magnetic layer 120 may contain at least one of Fe, Ni, Co, Mn, Al, Zn, Cu, Ba, Ti, Sn, Sr, P, B, N, C, W, Cr, Bi, Li, Y and Cd.

The coil pattern 120, 130 may include the first coil pattern 120 arranged in a region on the polymeric material layer 310 corresponding to the first soft magnetic layer 220, and the second coil pattern 130 arranged in a region on the polymeric material layer 310 corresponding to the second soft magnetic layer 230.

At this time, as illustrated in FIG. 2, the coil pattern 120, 130 may be adhered to the polymeric material layer 310 via an adhesive layer 135.

Figure 3:
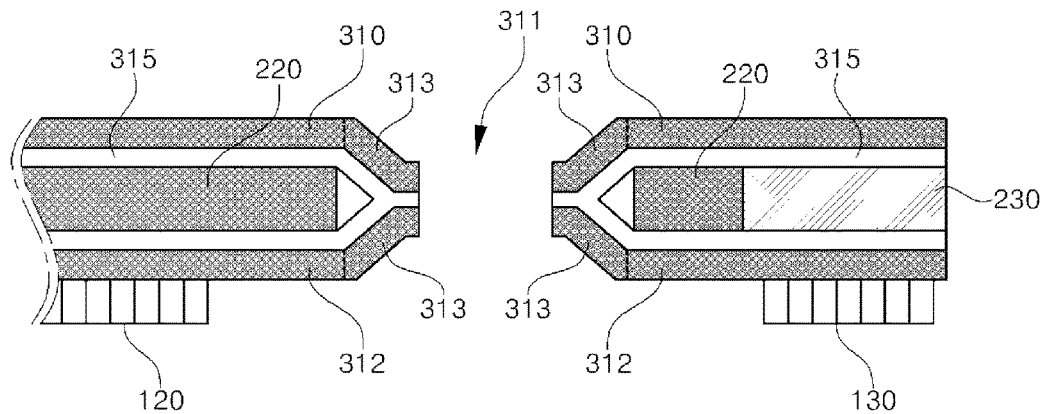
FIG. 3 is a cross-sectional view of a wireless charging and communication board according to another embodiment of the present application.

FIG. 3 is a cross-sectional view of a wireless charging and communication board according to another embodiment of the present application.

As illustrated in FIG. 3, a wireless charging and communication board according to the present embodiment of the invention includes: a soft magnetic layer 220, 230; a polymeric material layer 310, 312 arranged on one surface and the other surface of the soft magnetic layer 220, 230, and extending longer than an exposed portion of the soft magnetic layer 220, 230; and a coil pattern 120, 130 arranged on the polymeric material layer 310, 312.

However, in the embodiment of FIG. 3, the wireless charging and communication board further includes a polymeric material connector 313 intended for connecting the first polymeric material layer 310 and the second polymeric material layer 312 and surrounding the exposed portion of the soft magnetic layer 220. In this specification, a term of the polymeric material connector 313 can be used with a term of the extending portion. That is, a first extending portion may be extended in the first polymeric material layer 310, and a second extending portion may be extended in the second polymeric material layer 312.

Accordingly, in the embodiment of FIG. 3, the exposed portion may refer to an end exposed by a processing hole 311, and the polymeric material connector 313 surrounding the exposed portion of the soft magnetic layer 220 may prevent water penetration from the outside.

Figure 4:
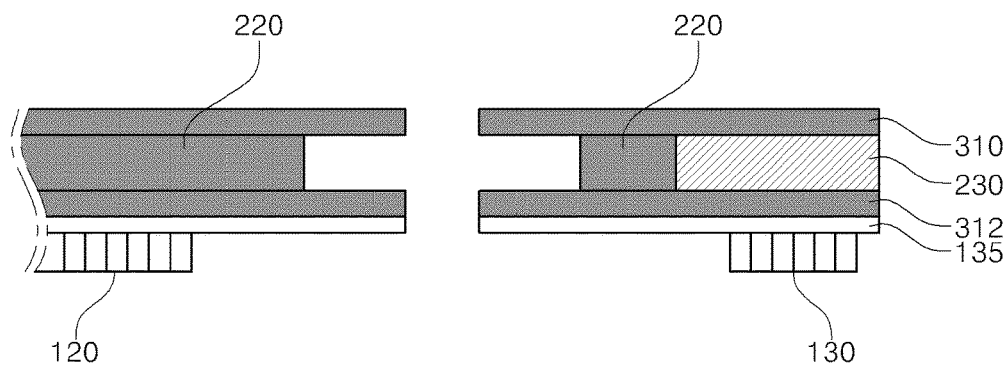
FIGS. 4 and 5 are cross-sectional views of a wireless charging and communication board according to a further embodiment of the present application.
Figure 5:
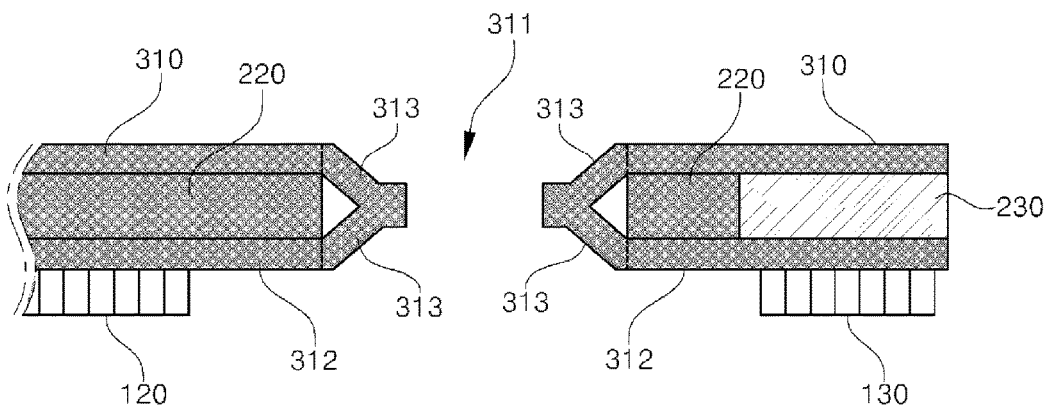

FIGS. 4 and 5 are cross-sectional views of a wireless charging and communication board according to a further embodiment of the present application.

According to the embodiment of FIGS. 4 and 5, the polymeric material layer 310, 312 may be directly formed on the soft magnetic layer 220, 230 without forming an adhesive layer 315 for adhering the polymeric material layer 310, 312 to the soft magnetic layer 220, 230.

At this time, the polymeric material layer 310, 312 may be directly formed on the soft magnetic layer 220, 230 via thermal compression bonding.

Like the embodiment of FIGS. 4 and 5, when the polymeric material layer 310, 312 is directly formed on the soft magnetic layer 220, 230, there is no need to use an adhesive layer so that a process can be simplified, a production cost can be reduced, and the wireless charging and communication board can be more thinly produced.

Meanwhile, in the embodiments of FIGS. 2 to 6, a cross section of the processing hole of the wireless charging and communication board has been explained as an example, but the exposed portion of an end for connecting the lead frame may be also identically configured.

Figure 6:
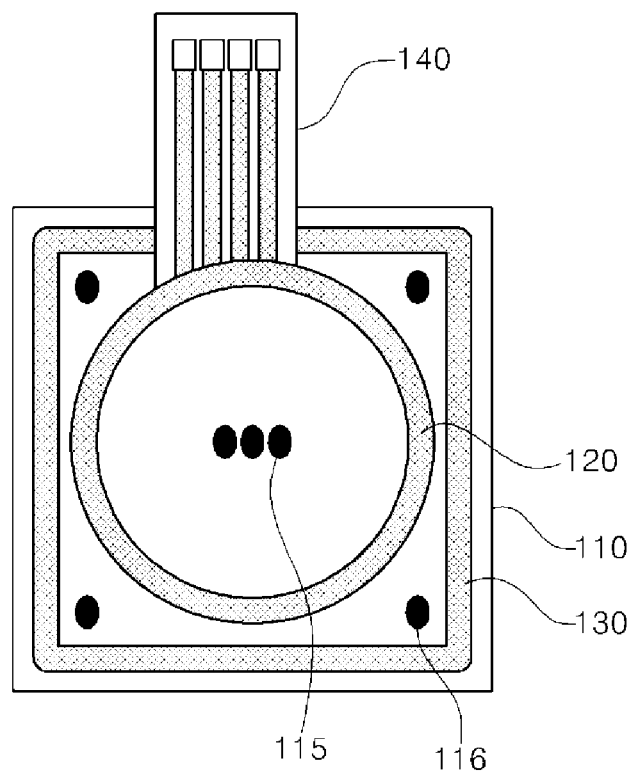
FIG. 6 is a top view illustrating coil patterns according to one embodiment of the present application.

FIG. 6 is a top view illustrating coil patterns according to one embodiment of the present application, more specifically, a view illustrating wireless charging and communication board included in a receiver according to one embodiment of the present application.

Figure 7:
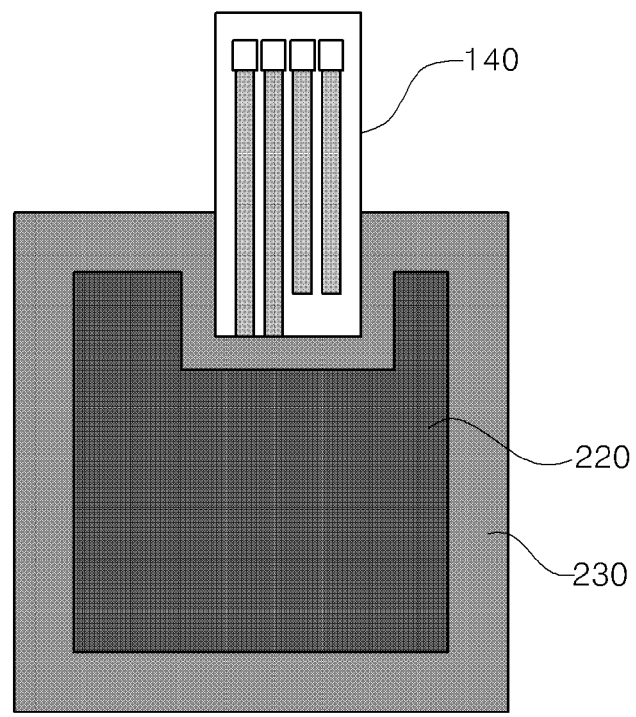
FIG. 7 is a top view illustrating a soft magnetic layer according to one embodiment of the present application.
Figure 8:
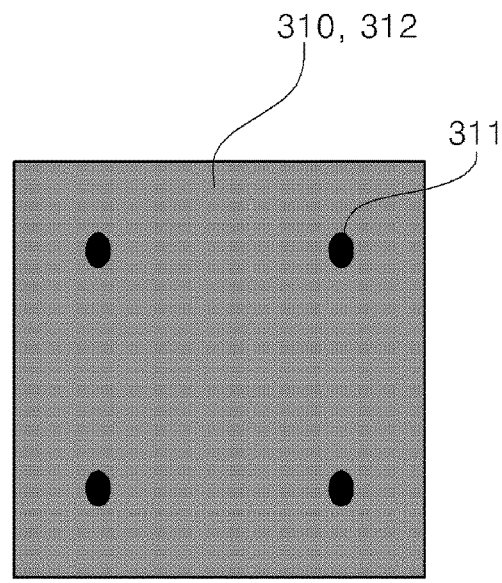
FIG. 8 is a top view illustrating a polymeric material layer according to one embodiment of the present application.

FIG. 7 is a top view illustrating a soft magnetic layer according to one embodiment of the present application and FIG. 8 is a top view illustrating a polymeric material layer according to one embodiment of the present application.

The coil pattern 120, 130 may be adhered to the polymeric material layer 310 via the adhesive layer 135 as shown in FIG. 2, or may be disposed on a separate substrate 110 as shown in FIG. 6.

As illustrated in FIG. 6, align marks 115, 116 for enabling aligning upon the wireless charging and communication board may be formed on the substrate 110.

Also, as illustrated in FIGS. 7 and 8, the wireless charging and communication board may further include a lead frame 140 connected to the coil pattern 120, 130, and the second soft magnetic layer 230 may be disposed to surround the lead frame 140.

More specifically, as shown in FIG. 4, the second soft magnetic layer 230 may be disposed to surround the lead frame 140 at a regular interval of 1 to 3 mm. As such, when the second soft magnetic layer 230 is disposed to surround the lead frame 140 at the regular interval, even though the lead frame 140 is disposed, the problem of a reduction in transmission efficiency upon charging or a reduction in a recognition distance upon data communication can be prevented.

Also, in the exposed portion of an end for connecting the lead frame 140, the polymeric material layer 310, 312 extending longer than the soft magnetic layer 220, 230 may be formed as shown in FIG. 2, or the polymeric material connector 313 surrounding an end of the polymeric material layer 310, 312 may be formed as shown in FIG. 3.

The polymeric material layer 310, 312 of FIG. 8 may be disposed on one surface and the other surface of the first and second soft magnetic layers 220, 230. The polymeric material layer 310, 312 may be disposed to be adhered to the first and second magnetic layer 220, 230 via the adhesive layer 315.

Also, the processing hole 311 may be formed in the polymeric material layer 310, 312 and the soft magnetic layer 220.

The processing hole 311 may perform aligning with the align marks 115, 116 of FIG. 6 upon manufacturing the wireless charging and communication board.

Figure 9:
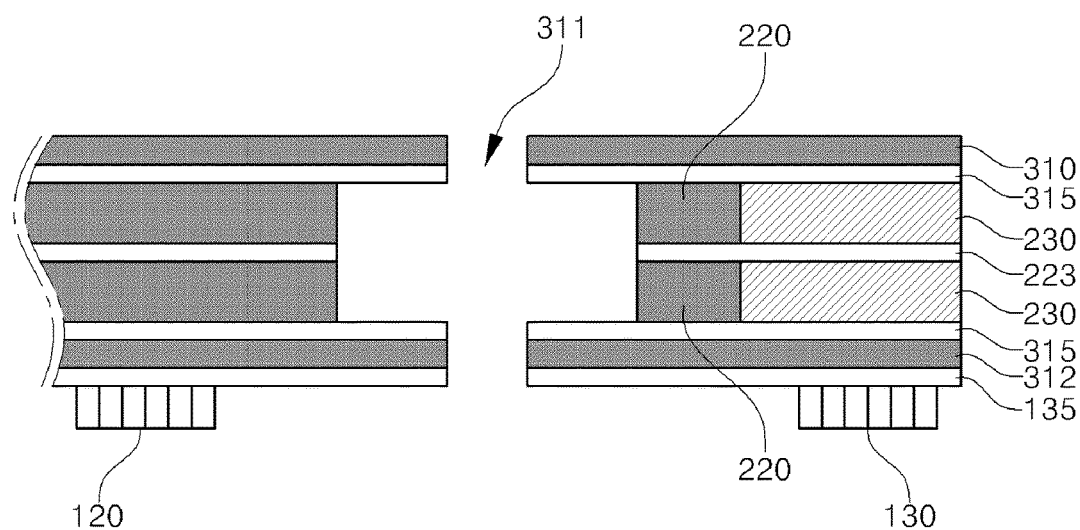
FIGS. 9 and 10 are cross-sectional views of a wireless charging and communication board according to yet another embodiment of the present application.
Figures 10, 11:
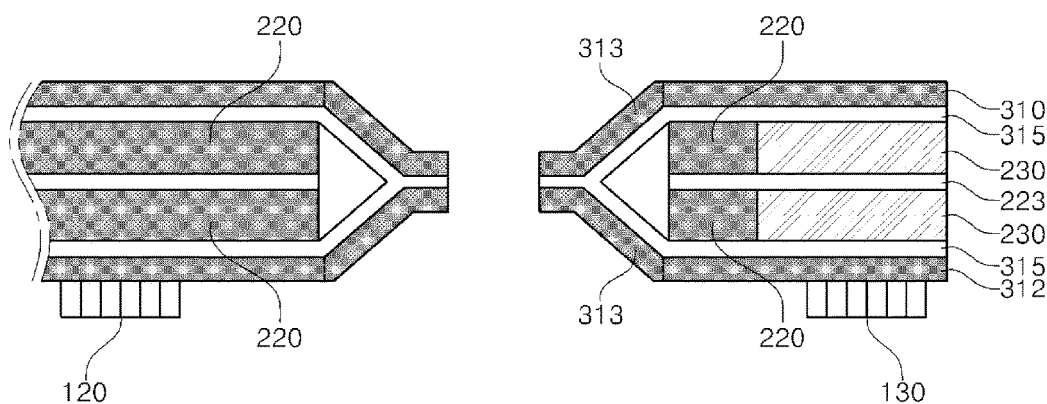
FIGS. 11 to 13 are view illustrated for explaining transmission efficiency and a recognition distance of the wireless charging and communication board according to one embodiment of the present application.

FIGS. 9 and 10 are cross-sectional views of a wireless charging and communication board according to yet another embodiment of the present application.

The wireless charging and communication board according to the present embodiment of the invention of FIGS. 9 and 10 may be configured such that the soft magnetic layer 220, 230 is adhered onto one surface and the other surface of the adhesive layer 223, respectively.

According to the embodiment of the invention of FIGS. 9 and 10, the soft magnetic layer 220, 230 may be added in plural numbers so that transmission efficiency upon charging can be adjusted or improved, a recognition distance upon data communication can be adjusted.

Figure 12:
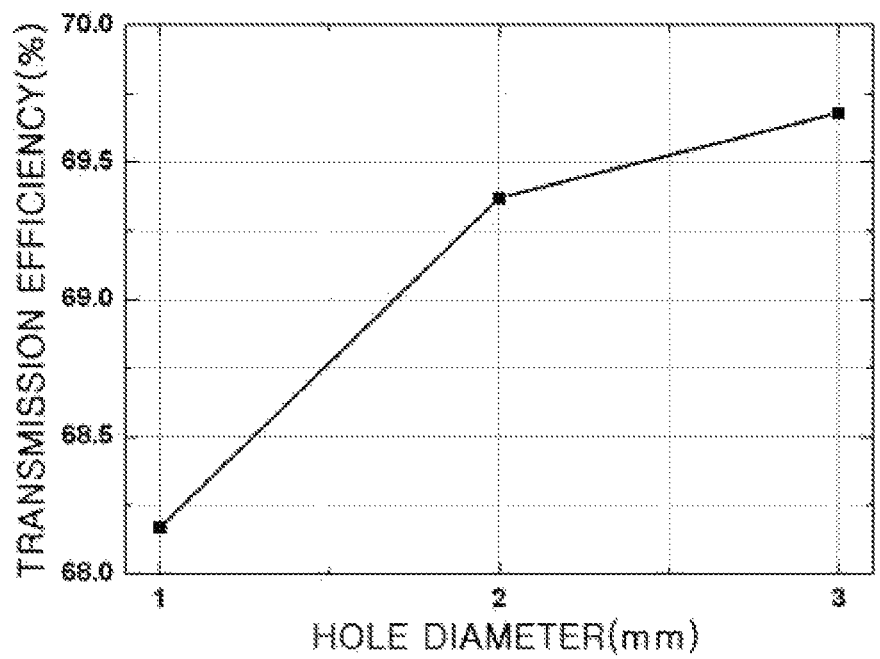
Figure 13:
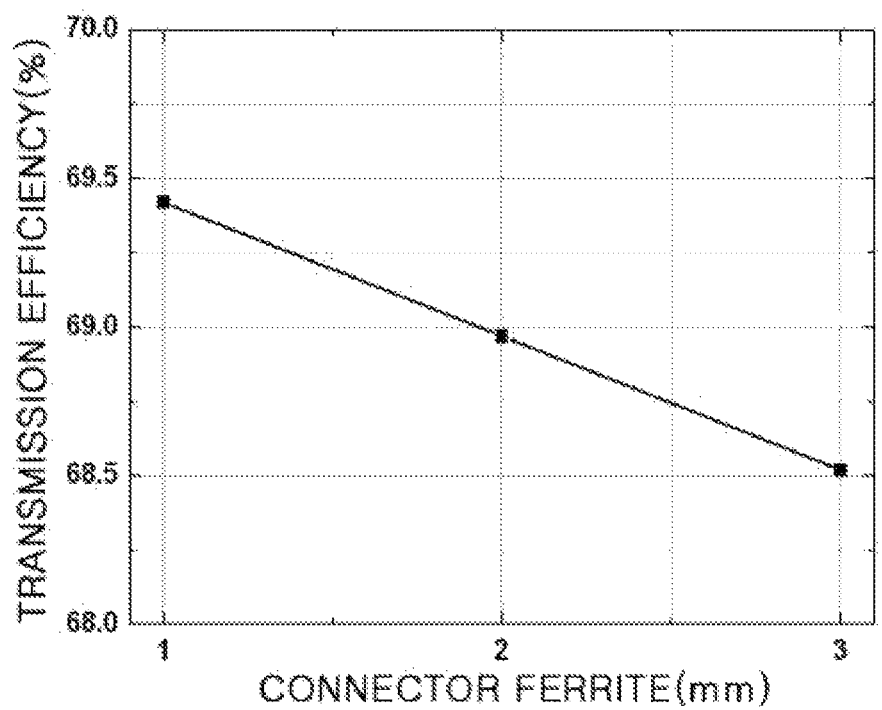

FIGS. 11 to 13 are view illustrated for explaining transmission efficiency and a recognition distance of the wireless charging and communication board according to one embodiment of the present application.

More specifically, FIG. 11 is a table showing the comparison of charges in transmission efficiency and a recognition distance according to a conventional art and the embodiment of the present application, FIG. 12 is a graph illustrating a charge in transmission efficiency resulting from a change in a diameter of the processing hole according to the embodiment of the present application, and FIG. 13 is a graph illustrating a change in transmission efficiency resulting from a distance of the soft magnetic layers according to the embodiment of the present application.

According to the present embodiment of the invention, as illustrated in FIG. 11, comparing embodiment A in which the second soft magnetic layer does not surround around the lead frame, and a processing hole is not formed, and embodiment B in which the second soft magnetic layer surrounds around the lead frame, and the processing hole is formed, there is a slight difference in transmission efficiency and there is no difference in a recognition distance.

Also, as illustrated in FIG. 12, when a diameter of the processing hole is changed to the range of 1 to 3 mm, the effect of an increase in transmission efficiency is generated. As illustrated in FIG. 13, when the soft magnetic layer (the second soft magnetic layer) surrounds around the lead frame, transmission efficiency is slight reduced, so there is no large difference in transmission efficiency.

As set forth above, according to some embodiments of the present application, the wireless charging and communication board may enable both the wireless power conversion (WPC) and near field communication (NFC).

According to some embodiments of the present application, the a portion of the soft magnetic layer exposed to the atmosphere is minimized so that the inflow of a foreign substance to the outside can be minimized, and the soft magnetic layer is disposed to surround the lead frame at a regular interval so that the problems of a reduction in transmission efficiency upon charging and a reduction in a recognition distance upon data communication can be overcome even though the lead frame is disposed.

Furthermore, according to some embodiments of the present application, the soft magnetic layer is added so that transmission efficiency upon charging can be adjusted or improved, and a recognition distance upon data communication can be adjusted.

An aspect of embodiments of the present application provides a wireless charging and communication board that enables wireless power conversion (WPC) and near field communication (NFC).

Also, another aspect of embodiments of the present application provides a wireless charging and communication board which is configured such that a portion of a soft magnetic layer exposed to the atmosphere is minimized so that the inflow of a foreign substance to the outside can be minimized, and the soft magnetic layer is disposed to surround a lead frame at a regular interval so that the problems of a reduction in transmission efficiency upon charging and a reduction in a recognition distance upon data communication can be overcome even though the lead frame is disposed.

Also, a further aspect of embodiments of the present application provides a wireless charging and communication board to which a soft magnetic layer is added so that transmission efficiency upon charging can be adjusted or improved, and a recognition distance upon data communication can be adjusted, and a wireless charging and communication device including the wireless charging and communication board.

According to an aspect of embodiments of the present invention, a wireless charging and communication board may include: a plurality of soft magnetic layers; a first polymeric material layer arranged on one surface of the plurality of the soft magnetic layers; a second polymeric material layer arranged on the other surface opposed to the one surface; and a coil pattern arranged on the second polymeric material layer, wherein the plurality of soft magnetic layers are disposed between the first polymeric material layer and the second polymeric material layer, wherein the first polymeric material layer comprises a first extending portion extending longer than the plurality of the soft magnetic layers; wherein the second polymeric material layer comprises a second extending portion extending longer than the plurality of the soft magnetic layers, and wherein the first extending portion and the second extending portion contact with each other. The first polymeric material layer and the first extending portion are made of same material.

A distance between the first extending portion and the second extending portion may become closer as the plurality of the soft magnetic layers becomes farther.

A length (l) of the first extending portion or the second extending portion and a thickness (h) of the plurality of the soft magnetic layers may have a relation of the following equation, wherein A represents a constant of 0.6 to 10.

$$l = A \times h \quad \text{[Equation]}$$

Any one of the first polymeric material layer and the second polymeric material layer may contain any one material of polyethylene, polyacrylic, polyimide, polyamide, and polyurethane.

The wireless charging and communication board may further include an adhesive layer intended for adhering the first polymeric material layer and the second polymeric material layer to the plurality of the soft magnetic layers.

An air gap may be further formed between the plurality of the soft magnetic layers, the first extending portion and the second extending portion.

The plurality of the soft magnetic layer may include: a first soft magnetic layer; and a second soft magnetic layer arranged on the first soft magnetic layer.

The first soft magnetic layer and the second soft magnetic layer may be made of different materials.

The coil pattern may include: a first coil pattern arranged in a region on the polymeric material layer corresponding to the first soft magnetic layer; and a second coil pattern arranged in a region on the polymeric material layer corresponding to the second soft magnetic layer;

The wireless charging and communication board may further include a lead frame connected to the coil pattern. The first polymeric material layer and the second polymeric material layer may be arranged to surround the lead frame.

The second soft magnetic layer may be arranged to surround the lead frame at a regular interval.

Any one of the first soft magnetic layer and the second soft magnetic layer may be made with any one of an amorphous alloy, a crystalline alloy, an amorphous alloy ribbon, a nanocrystalline ribbon, and a silicon steel plate.

The soft magnetic layer may be made of a ferrite material and may be formed in a pellet form, a plate form, a ribbon form, a foil form, or a film form.

The soft magnetic layer may contain at least one of Fe, Ni, Co, Mn, Al, Zn, Cu, Ba, Ti, Sn, Sr, P, B, N, C, W, Cr, Bi, Li, Y and Cd.

The polymeric material layer may be a black film.

The wireless charging and communication board may further include a housing radiating heat from the coil pattern.

According to another aspect of embodiments of the present invention, a portable terminal includes a housing; a plurality of soft magnetic layers arranged in the housing; a first polymeric material layer arranged on one surface of the plurality of the soft magnetic layers; a second polymeric material layer arranged on the other surface opposed to the one surface; and a coil pattern arranged on the second polymeric material layer, wherein the plurality of soft magnetic layers are disposed between the first polymeric material layer and the second polymeric material layer, wherein the first polymeric material layer comprises a first extending portion extending longer than the plurality of the soft magnetic layers, wherein the second polymeric material layer comprises a second extending portion extending longer than the plurality of the soft magnetic layers, and wherein the first extending portion and the second extending portion contact with each other.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present application and is not to be construed as limited to the specific embodiments disclosed, and that modifications to the disclosed embodiments, as well as other embodiments, are intended to be included within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A board provided for wireless charging and communication, comprising:
    a first polymeric film;
    a first adhesive layer provided on the first polymeric film;
    a plurality of soft magnetic layers provided on the first adhesive layer;
    a second polymeric film provided on the plurality of soft magnetic layers; and
    a coil pattern provided on one surface of one of the first polymeric film and the second polymeric film and including a wireless charging coil and a near field communication coil,
    wherein:
        the plurality of soft magnetic layers includes one or more of an amorphous alloy, a crystalline alloy, an amorphous alloy ribbon, a nanocrystalline ribbon, or a silicon steel plate including iron (Fe),
        the first polymer film includes a first extending portion that extends further than the plurality of soft magnetic layers,
        the second polymer film includes a second extending portion that extends further than the plurality of soft magnetic layers,
        a portion of an upper surface of the first extending portion and a portion of a lower surface of the second extending portion are connected to each other in a connected area,
        the connected area is spaced apart from a side portion of the plurality of soft magnetic layers, and
        the connected area includes an area that extends further outward than the side portion of the plurality of soft magnetic layers.

2. The board of claim 1, wherein at least one of the first polymer film or the second polymer film is a black film.

3. The board of claim 1, wherein a length(l) of at least one of the first extending portion or the second extending portion and a thickness(h) of the plurality of soft magnetic layers have a relation of a following equation, wherein A represents a constant of 0.6 to 10:

$$l = A \times h.$$

4. The board of claim 1, wherein at least one of the first polymeric film or the second polymeric film includes one or more material of polyethylene, polyacrylic, polyimide, polyamide, and polyurethane.

5. The board of claim 1, wherein an air gap is formed between the side portion of the plurality of soft magnetic layers and the connected area.

6. The board of claim 1, further comprising a lead frame connected to the coil pattern,
    wherein the first polymeric film and the second polymeric film are provided to surround the lead frame.

7. The board of claim 1, wherein the near field communication coil is provided to surround a side of the wireless charging coil.

8. The board of claim 1, wherein a terminal of at least one of the first extending portion and the second extending portion is provided in the connected area.

9. The board of claim 1, wherein the plurality of soft magnetic layers includes a first soft magnetic sheet and a second soft magnetic sheet, and the second soft magnetic sheet is provided on the first soft magnetic sheet.

10. The board of claim 9, further comprising a soft magnetic layer for near field communication provided to surround a side surface of the first soft magnetic sheet and the second soft magnetic sheet.

11. The board of claim 10, wherein the soft magnetic layer for near field communication includes at least one of Fe, Ni, Co, Mn, Al, Zn, Cu, Ba, Ti, Sn, Sr, P, B, N, C, W, Cr, Bi, Li, Y or Cd.

12. The board of claim 1, wherein the first adhesive layer includes a first extending adhesive portion that extends further outward than the side portion of the plurality of soft magnetic layers, and a portion of the first extending adhesive portion is provided in the connected area.

13. The board of claim 12, wherein the portion of the first extending adhesive portion is provided between the first extending portion and the second extending portion in the connected area.

14. The board of claim 13, further comprising a second adhesive layer arranged between the plurality of soft magnetic layers and the second polymeric film.

15. The board of claim 14, wherein the second adhesive layer includes a second extending adhesive portion that extends further outward than the side portion of the plurality of soft magnetic layers, and a portion of the second extending adhesive portion is provided in the connected area.

16. The board of claim 15, wherein the portion of the second extending adhesive portion is provided between the first extending portion and the second extending portion in the connected area.

17. The board of claim 16, wherein the first extending adhesive portion and the second extending adhesive portion are in direct contact with each other.

18. The board of claim 12, wherein a terminal of the first extending adhesive portion is provided in the connected area.

19. A portable terminal, comprising:
   a housing;
   a first polymeric film provided in the housing;
   a first adhesive layer provided on the first polymeric film;
   a plurality of soft magnetic layers provided on the first adhesive layer;
   a second polymeric film provided on the plurality of soft magnetic layers; and
   a coil pattern provided on one surface of the first polymeric film and the second polymeric film, and including a wireless charging coil and a near field communication coil,
wherein:
   the plurality of soft magnetic layers includes one or more of an amorphous alloy, a crystalline alloy, an amorphous alloy ribbon, a nanocrystalline ribbon, or a silicon steel plate including iron (Fe),
   the first polymer film includes a first extending portion that extends further than the plurality of soft magnetic layers,
   the second polymer film includes a second extending portion that extends further than the plurality of soft magnetic layers,
   a portion of an upper surface of the first extending portion and a portion of a lower surface of the second extending portion are connected to each other in a connected area,
   the connected area is spaced apart from a side portion of the plurality of soft magnetic layers, and
   the connected area includes an area that extends further outward than the side portion of the plurality of soft magnetic layers.

20. The portable terminal of claim 19, wherein the first adhesive layer includes a first extending adhesive portion that extends further outward than the side portion of the plurality of soft magnetic layers, and a portion of the first extending portion is provided in the connected area.

* * * * *